US008363086B1

(12) United States Patent
Shah (10) Patent No.: US 8,363,086 B1
(45) Date of Patent: Jan. 29, 2013

(54) INITIATING COMMUNICATIONS USING SHORT-RANGE WIRELESS COMMUNICATIONS

(75) Inventor: Chirag Shah, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/367,148

(22) Filed: Feb. 6, 2012

(51) Int. Cl.
*H04N 7/14* (2006.01)
(52) U.S. Cl. .................. 348/14.02; 455/414.3
(58) Field of Classification Search ............... 348/14.01, 348/14.02; 455/556.1, 414.1, 414.2, 414.3
See application file for complete search history.

(56) References Cited

U.S. PATENT DOCUMENTS

| | | | |
|---|---|---|---|
| 2008/0162141 A1 | 7/2008 | Lortz | |
| 2008/0230615 A1* | 9/2008 | Read et al. | 235/492 |
| 2009/0109032 A1 | 4/2009 | Braun et al. | |
| 2009/0144456 A1* | 6/2009 | Gelf et al. | 710/8 |
| 2009/0192935 A1 | 7/2009 | Griffin et al. | |
| 2009/0203367 A1* | 8/2009 | Pamminger et al. | 455/414.3 |
| 2010/0294835 A1* | 11/2010 | Bam et al. | 235/382 |
| 2011/0012715 A1* | 1/2011 | Eschenauer et al. | 340/10.42 |
| 2011/0025816 A1* | 2/2011 | Brewer et al. | 348/14.02 |

OTHER PUBLICATIONS

Gupta et al., "NFC Smart Poster White Paper," NFC Forum Ecosystem Development Working Group, found at http://www.nfc-forum.org/resources/white_papers, Apr. 21, 2011, 10 pp.

"NFC Forum Smart Posters," How to use NFC tags and readers to create interactive experiences that benefit both consumers and business, found at http://www.nfc-forum.org, Apr. 2011, 25 pp.

"NFC Forum Smart Poster Record Type Definition," Technical Specification, found at http://www.nfc-forum.org, Jul. 24, 2006, 15 pp.

* cited by examiner

*Primary Examiner* — Stella Woo
(74) *Attorney, Agent, or Firm* — Shumaker & Sieffert, P.A.

(57) ABSTRACT

In general, aspects of this disclosure are directed to techniques for initiating communications from a computing device based on messages received from short-range wireless devices. The computing device may receive, via short-range wireless communication, a message from a short-range communication device, the message including contact information of a remote computing device that is external both to the computing device and to the short-range communication device, location information associated with the short-range communication device, and authentication information usable by the computing device to authenticate the short-range communication device. Responsive to receiving the message from the short-range communication device, the computing device may authenticate the short-range communication device based on the authentication information. Responsive to the authenticating, the computing device may automatically initiate communications with the remote computing device based on the contact information. Computing device may communicate the location information associated with the short-range communication device to the remote computing device.

20 Claims, 8 Drawing Sheets

INITIATING COMMUNICATIONS USING SHORT-RANGE WIRELESS COMMUNICATIONS

TECHNICAL FIELD

Aspects of this disclosure relate generally toward computing devices and short-range wireless communications, such as near field communication (NFC).

BACKGROUND

Typically, Quick Response (QR) codes are placed onto posters or other advertising material to allow people to easily receive additional information about an event or product being advertised on the posters or other advertising material by capturing an image of the QR code with a mobile phone camera.

Although QR codes are an improvement over simply printing a phone number or a website address onto a poster or other advertising material, people often still ignore QR codes due to the complexity required in scanning a QR code. People often have to dig a mobile phone out of their pockets or purses, launch a specialized QR-scanning application, activate the camera on their mobile phone, and line up the camera with the QR code in order to scan the QR code an receive additional information associated with the QR code.

SUMMARY

In one aspect, this disclosure is directed to a method. The method may include receiving, by a computing device via short-range wireless communication, a message from a short-range wireless device, the message including: contact information of a remote computing device that is external both to the computing device and to the short-range wireless device, location information associated with the short-range wireless device, and authentication information usable by the computing device to authenticate the short-range wireless device. The method may further include, responsive to receiving the message from the short-range wireless device, authenticating the short-range wireless device based on the authentication information. The method may further include, responsive to the authenticating, automatically initiating communications, by the computing device with the remote computing device based on the contact information. The method may further include communicating the location information associated with the short-range wireless device to the remote computing device.

In another aspect, the disclosure is directed to a computing device. The computing device may include one or more processors. The computing device may further include a first short-range wireless device configured to receive a message from a second short-range wireless device via short-range wireless communication, the message including contact information of a remote computing device that is external both to the computing device and to the second short-range wireless device, location information associated with the second short-range wireless device, and authentication information usable by the computing device to authenticate the second short-range wireless device, and further configured to automatically input, responsive to receiving the message, the contact information of the remote computing device into a communication application. The computing device may further include the communication application operable by the one or more processors to initiate communications with the remote computing device based on the contact information inputted by the first short-range wireless device.

In another aspect, the disclosure is directed to a computer-readable medium containing instructions. The instructions, when executed on at least one programmable processor, may cause the at least one programmable processor to perform operations including receiving, by a computing device via short-range wireless communication, a message from a short-range wireless device, the message including contact information of a remote computing device that is external both to the computing device and to the short-range wireless device, and one or more pieces of metadata. The instructions, when executed on at least one programmable processor, may further cause the at least one programmable processor to perform operations including, responsive to receiving the message from the short-range wireless device, automatically creating, by the computing device, an outgoing message directed to the remote computing device based on the contact information. The instructions, when executed on at least one programmable processor, may further cause the at least one programmable processor to perform operations including populating, by the computing device without user intervention, a body of the outgoing message based on the one or more pieces of metadata.

The details of one or more aspects of the disclosure are set forth in the accompanying drawings and the description below. Other features, objects, and advantages of the disclosure will be apparent from the description and drawings, and from the claims.

DETAILED DESCRIPTION

In general, aspects of this disclosure are directed to techniques for initiating communications from a mobile device based on messages received from short-range wireless devices, such as RFID or near field communications (NFC) tags. Potential advantages of short-range wireless communication technology over QR codes may, in some examples, include being able to automatically communicate information via short-range wireless communications upon two short-range wireless devices, such as NFC sensors, being in range with each other, thus obviating the need to take pictures of any images of QR codes.

Figure 1:
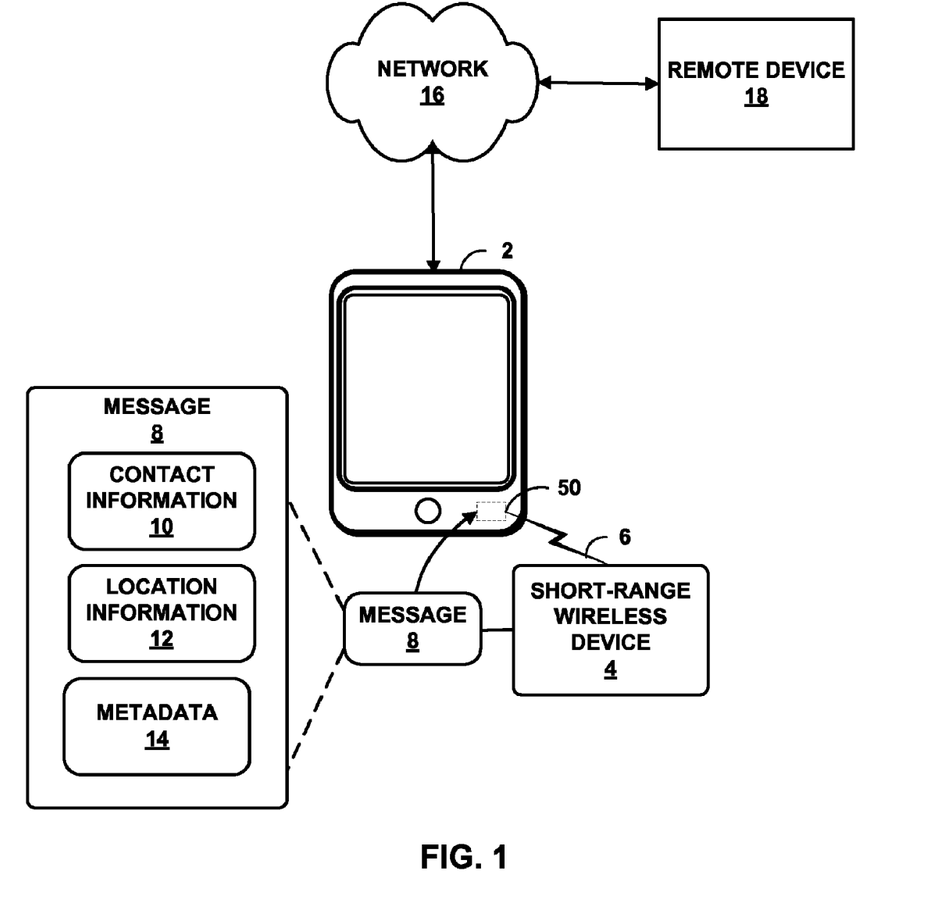
FIG. 1 is a conceptual diagram illustrating an example of a computing device interacting with an NFC tag according to some examples of the present disclosure.

FIG. 1 is a block diagram illustrating an example of a computing device interacting with a short-range wireless device. As shown in FIG. 1, computing device 2 may, in some examples, be a mobile computing device (e.g., a mobile phone, a tablet computer, or a personal digital assistant). Computing device 2 may, in some other examples, be a desktop computer, laptop computer, server system, or any other electronic device.

Computing device 2 may include NFC module 50 that is able to initiate short-range wireless communication via short-range wireless communication, such as via short range wireless communication network 6, with short-range wireless device 4. Short-range wireless device 4 may, in some examples, be a passive NFC tag, meaning that short-range wireless device 4 may not have an independent power source, and may depend on an active NFC device to come in close contact (such as within about four centimeters) of short-range wireless device 4, so that signals emanating from the active NFC device may be used to power short-range wireless device 4. Short-range wireless device 4 may store message 8 for transmittal when short-range wireless device 4 is powered. In one example, message 8 may include contact information 10, location information 12, and one or more pieces of metadata 14. Contact information 10 may, in one example, include information for contacting remote computing device 18 external to both computing device 2 and to short-range wireless device 4. Contact information 10 may, in another example, be part of a query that is sent to remote computing device 18. In some examples, contact information 10 may include but is not limited to a phone number, an e-mail address, a universal resource locator (URL), a nickname associated with a user that acts as an online alias for the user, or an office name or number. Location information 12 may include information regarding a location that is associated with short-range wireless device 4. In some examples, location information 12 may specify the location of short-range wireless device 4. In some examples, location information 12 may specify latitude and longitude, global positioning system (GPS) coordinates, location information regarding the billboard or poster associated with short-range wireless device 4, an address, an office number, a building name, or an intersection name. In some examples, message 8 may not include location information 12.

Message 8 may also include one or more pieces of metadata 14. Metadata 14 may include additional information, such as additional textual information, related to short-range wireless device 4, including additional information regarding contact information 10 and/or location information 12. In some examples, metadata 14 may include security and/or authentication information that indicates short-range wireless device 4 is safe to communicate with and/or has not been tampered, and that is usable by computing device 2 to authenticate short-range wireless device 4. In some examples, message 8 may not include metadata 14.

Computing device 2 may initiate communications with short-range wireless device 4 by being placed within a certain distance (such as within four centimeters as one non-limiting example) from short-range wireless device 4, so that wireless signals transmitted from computing device 2 may reach short-range wireless device 4 and be used to power short-range wireless device 4 if short-range wireless device 4 is a passive NFC tag. Once short-range wireless device 4 is powered by computing device 2, a short-range wireless network 6 may be established between computing device 2 and short-range wireless device 4. Short-range wireless device 4 may be configured to send message 8 stored on short-range wireless device 4 to computing device 2 via short-range wireless network 6. Computing device 2 may receive, via short-range wireless network 6, message 8 from short-range wireless device 4.

If short-range wireless device 4 is an NFC device, computing device 2 may operate in at least two different modes to communicate with short-range wireless device 4 using NFC. For example, computing device 2 and short-range wireless device 4 may be configured to operate in a passive mode and an active mode of operation. In an active mode of operation, computing device 2 may generate a first radio field that is detected by short-range wireless device 4 in physical proximity to computing device 2. In response, short-range wireless device 4 may generate a second radio field that is detected by computing device 2. In this way, data may be communicated between computing device 2 and short-range wireless device 4, such as using peer-to-peer communication. In the active mode, computing device 2 may also power or activate a passive device to retrieve data from the passive device, as further described below.

In a passive mode of operation, load modulation techniques may be employed to facilitate data communication between computing device 2 and short-range wireless device 4. In a passive mode, short-range wireless device 4 does not generate a radio field in response to the radio field of computing device 2. Instead, short-range wireless device 4 may include electrical hardware (e.g., an NFC component) that generates a change in impedance in response to the radio field generated by computing device 2. For example, computing device 2 may generate a radio field that is received by short-range wireless device 4. Electrical hardware in short-range wireless device 4 may generate a change in impedance in response to the radio field. The change in impedance may be detected by short-range wireless device 50, such as a NFC module, of computing device 2. In this way, load modulation techniques may be used by computing device 2 to obtain message 8 from short-range wireless device 4. In other words, computing device 2 may obtain message 8 from short-range wireless device 4, but short-range wireless device 4 would not receive any data from computing device 2 in the passive mode. Other well-known modulation techniques including phase modulation and/or amplitude modulation may also be employed to facilitate data communication between computing device 2 and short-range wireless device 4 in other examples.

Generally, short-range wireless device 4 may operate in passive mode. Since a passive short-range wireless device does not need a dedicated power supply, short-range wireless device 4 may be placed in a variety of locations, on any surface, or even as part of smaller items. For example, short-range wireless device 4 may be embodied as a sticker or adhesive poster that is placed on the wall of a building. Passive NFC tags may also be less expensive and more difficult to corrupt with computing device 2. In this manner, short-range wireless device 4 may include electrical hardware that generates a change in impedance in response to a radio field. However, short-range wireless device 4 may be another computing device in other examples. For example, short-range wireless device 4 may be a computing device that operates in a passive NFC mode and/or an active NFC mode. In other words, short-range wireless device 4 may include active NFC hardware. This active NFC hardware may be configured to emulate passive NFC hardware or participate in active near field communication.

In an example of a passive NFC tag, short-range wireless device 4 may deliver message 8 to computing device 2 responsive to detecting a radio field generated by short-range wireless device 50 of computing device 2. In other words, message 8 may be data that is stored on short-range wireless device 4. Upon detecting the radio field (e.g., receiving power sufficient to transmit data) computing device 2 may receive message 8. In this manner, short-range wireless device 4 may only be capable of delivering or sending message 8 when computing device 2 is within close physical proximity to short-range wireless device 4. Although the user may physically touch, bump, or tap computing device 2 to short-range wireless device 4, computing device 2 may be capable of receiving message 8 from short-range wireless device 4 without physically touching short-range wireless device 4.

Although only one short-range wireless device 4 is provided in the example of FIG. 1, short-range wireless device 4 may be representative of any number of short-range wireless devices configured to communicate with computing device 2 using a short-range wireless networking protocol, such as an NFC protocol. Since each short-range wireless device 4 may be relatively simple and configured to communicate with any number of other short-range wireless devices, computing device 2 may be capable of establishing communication with thousands or even millions of different short-range wireless devices.

In some examples, after computing device 2 receives at least a portion or all of message 8, computing device 2 may, responsive to receiving message 8 from short-range wireless device 4, authenticate short-range wireless device 4 based on the authentication information. Responsive to the authenticating, computing device 2 may automatically initiate communications with remote computing device 18 based on contact information 10 included in message 8 and received by computing device 2. In some examples, initiating communications automatically may mean that a user does not need to interact with computing device 2 after placing computing device 2 within range of short-range wireless device 4 to initiate communications between computing device 2 and remote computing device 18. Computing device 2 may communicate with remote computing device 18 over network 16, including but not limited to a wired or wireless network, a peer-to-peer network, a cellular telephone network, or a public switched telephone network, to name only a few examples. In some examples, computing device 2 may communicate location information 12 associated with short-range wireless device 4 to remote computing device 18.

In some examples, responsive to receiving message 8 from short-range wireless device 4, computing device 2 may authenticate short-range wireless device 4 based on the authentication information included in metadata 14. In some examples, message 8 may include metadata 14, and metadata 14 may specify security information, including but not limited to a pass phrase, a cryptographic key, a digital signature, or a signed certificate certifying the legitimacy of message 8. In some examples, computing device 2 may authenticate the security information specified by metadata 14 to determine whether message 8 authorizes computing device 2 to initiate communications with remote computing device 18. Responsive to the authenticating, computing device 2 may automatically initiate communications with remote computing device 18 based on contact information 10 to communicate with remote computing device 18.

Figure 2:
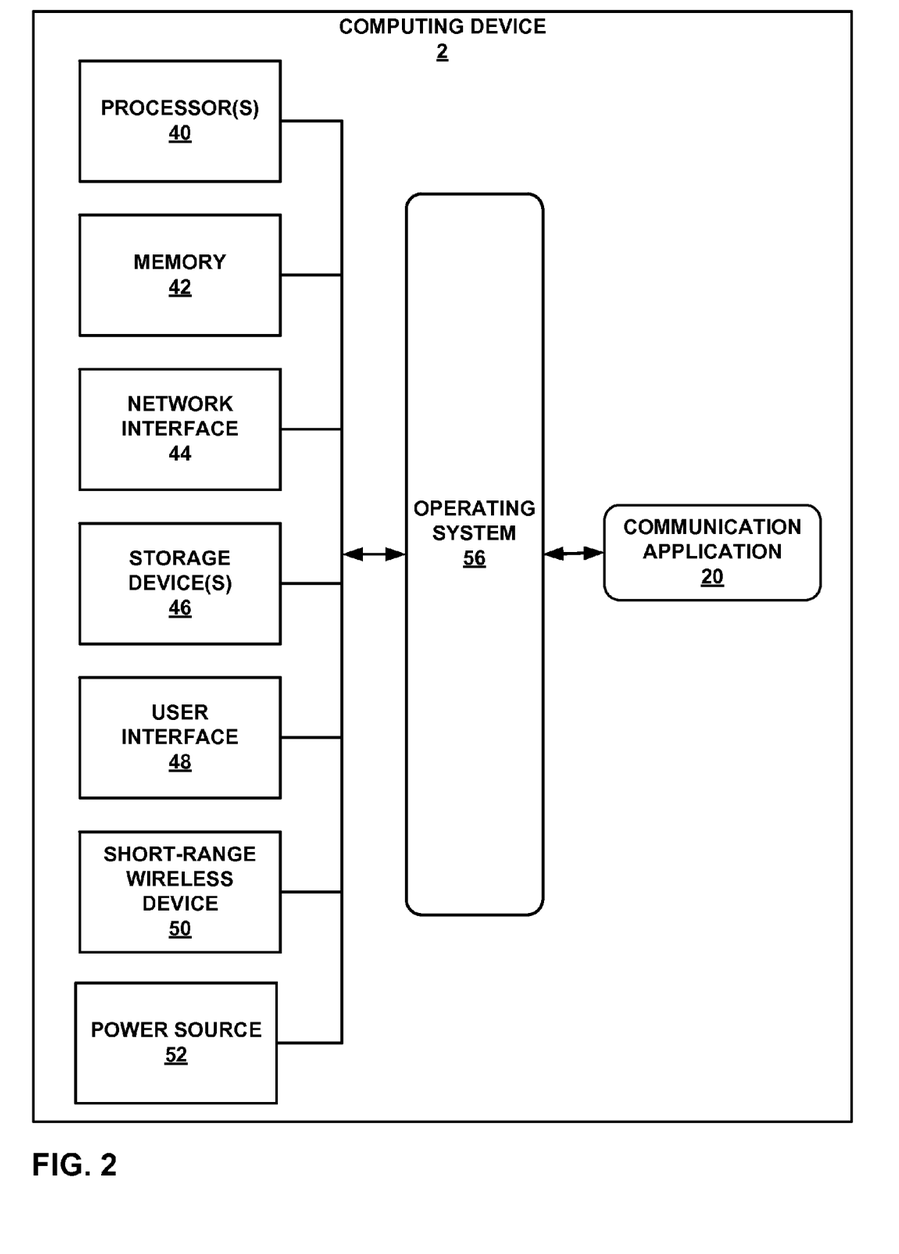
FIG. 2 is a block diagram illustrating components of the example computing device shown in FIG. 1 according to some examples of the present disclosure.

FIG. 2 is a block diagram illustrating components of example computing device 2 shown in FIG. 1. FIG. 2 illustrates only one particular example of computing device 2, and many other examples of computing device 2 may be used in other instances.

As shown in the specific example of FIG. 2, computing device 2 may include one or more processors 40, memory 42, a network interface 44, one or more storage devices 46, user interface 48, power source 52, and short-range wireless device 50. Computing device 2 may also include an operating system 56, which may include modules and/or applications that are executable by processors 40 and computing device 2. Computing device 2, in one example, may also include communication application(s) 20, which may be executable by one or more processors 40 of computing device 2. Each of components 40, 42, 44, 46, 48, 50, 52, 56, and 20 may be interconnected (physically, communicatively, and/or operatively) for inter-component communications.

Processors 40, in one example, may be configured to implement functionality and/or process instructions for execution within computing device 2. For example, processors 40 may be capable of processing instructions stored in memory 42 or instructions stored on storage devices 46. These instructions may define or otherwise control the operation of operating system 56, and communication application(s) 20.

Memory 42 may, in one example, be configured to store information within computing device 2 during operation. Memory 42, in some examples, may be described as a computer-readable storage medium. In some examples, memory 42 may be a temporary memory, meaning that a primary purpose of memory 42 is not long-term storage. Memory 42 may, in some examples, be described as a volatile memory, meaning that memory 42 does not maintain stored contents when the computer is turned off. Examples of volatile memories may include random access memories (RAM), dynamic random access memories (DRAM), static random access memories (SRAM), and other forms of volatile memories known in the art. In some examples, memory 42 may be used to store program instructions for execution by processors 40. Memory 42 may, in one example, be used by software or applications running on computing device 2 (e.g., communication application(s) 20) to temporarily store information during program execution.

Storage devices 46 may, in some examples, also include one or more computer-readable storage media. Storage devices 46 may be configured to store larger amounts of information than memory 42. Storage devices 46 may further be configured for long-term storage of information. In some examples, storage devices 46 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories.

Computing device 2 may, in some examples, also include network interface 44. Computing device 2 may, in one example, use network interface 44 to communicate with external devices (e.g., remote device 18 of FIG. 1) via one or more networks, such as network 16 in FIG. 1. Network interface 44 may be a network interface card, such as an Ethernet card, an optical transceiver, a radio frequency transceiver, or any other type of device that can send and receive information. Other examples of such network interfaces may include Bluetooth, 3G and WiFi radios in mobile computing devices as well as USB. In some examples, computing device 2 may use network interface 44 to wirelessly communicate with an external device (e.g., remote device 18 of FIG. 1) such as a server, mobile phone, or other networked computing device.

Computing device 2 may, in one example, also include one or more user interfaces 48. User interface 48 may be configured to receive input from a user (e.g., tactile, audio, or video feedback). User interface 48 may include a touch-sensitive and/or a presence-sensitive screen, mouse, a keyboard, a voice responsive system, or any other type of device for detecting a command from a user. In some examples, user interface 48 may include a touch-sensitive screen, mouse, keyboard, microphone, or camera.

User interface 48 may also include, combined or separate from input devices, output devices. In this manner, user interface 48 may be configured to provide output to a user using tactile, audio, or video stimuli. In one example, user interface 48 may include a touch-sensitive screen, sound card, a video graphics adapter card, or any other type of device for converting a signal into an appropriate form understandable to humans or machines. In addition, user interface 48 may include a speaker, a cathode ray tube (CRT) monitor, a liquid crystal display (LCD), or any other type of device that can generate intelligible output to a user.

Computing device 2, in some examples, may include power source 52, which may be rechargeable and provide power to computing device 12. Power source 52 may, in some examples, be a battery made from nickel-cadmium, lithium-ion, or other suitable material. In other examples, power source 52 may be a power source capable of providing stored power or voltage from another power source.

In addition, computing device 12 may include short-range wireless device 50. As described herein, short-range wireless device 50 may be active hardware, such as an active NFC device, that is configured to communicate with and receive messages (e.g., message 8 of FIG. 1) from short-range wireless device 4. In general, short-range wireless device 50 may be configured to communicate wirelessly with other devices in physical proximity to short-range wireless device 50 (e.g., less than approximately four centimeters). In some examples, short-range wireless device 50 may be configured to communicate according to NFC, RFID, Bluetooth, Ultra-Wideband radio, or other similar protocols. In some examples, short-range wireless device 50 may be an external hardware module that is coupled with computing device 12 via a bus (such as via a Universal Serial Bus (USB) port).

Short-range wireless device 50, in some examples, may also include software which may, in some examples, be independent from operating system 56, and which may, in some other examples, be a sub-routine of operating system 56. If the software included by short-range wireless device 50 is a sub-routine of operating system 56, the software included by short-range wireless device 50 may be able to instruct operating system 56 to launch communication application(s) 20 in the event that communication application(s) 20 is not running when short-range wireless device 4 is in close physical proximity to computing device 2. Responsive to receiving message 8 from short-range wireless device 4, short-range wireless device 50 may cause communication application(s) 20 to launch and may further cause communication application(s) 20 to initiate communications with an external device (e.g., remote device 18 of FIG. 1). In some examples, short-range wireless device 50 may input, responsive to receiving message 8 and without user intervention, contact information 10 into communication application(s) 20. In some examples, short-range wireless device 50 may determine that message 8 is authorized to cause computing device to initiate communications with an external device via communication application(s) 20.

Computing device 2 may include operating system 56. Operating system 56 may, in some examples, control the operation of components of computing device 2. For example, operating system 56 may, in one example, facilitate the interaction of communication application(s) 20 with processors 40, memory 42, network interface 44, storage device 46, user interface 48, short-range wireless device 50, and power source 52.

Communication application(s) 20 may be an application that may communicate, such as via network interface 44, with an external device (e.g., remote device 18 of FIG. 1) via a network (e.g., network 16 of FIG. 1). Communication application(s) 20 may, in some examples, include but is not limited to a phone application, a text message application, a video conferencing application, a Voice over Internet Protocol (VoIP) application, a web browser, or a navigation application. Although communication application(s) 20 may be software independent from operating system 56, communication application(s) 20 may also be a sub-routine of operating system 56 in other examples. If short-range wireless device 50 is communicating with short-range wireless device 4 to receive messages (e.g., message 8 of FIG. 1), short-range wireless device 50 may pass information based on the received messages to communication application(s) 20, and may cause communication application(s) 20 to, responsive to short-range wireless device 50 receiving message 8, initiate communications with an external device (e.g., remote device 18 of FIG. 1) via a network (e.g., network 16 of FIG. 1), based on the information passed from short-range wireless device 50 to communication application(s) 20.

Any applications (e.g., communication application(s) 20) implemented within or executed by computing device 2 may be implemented or contained within, operable by, executed by, and/or be operatively/communicatively coupled to components of computing device 2 (e.g., processors 40, memory 42, network interface 44, storage devices 46, user interface 48, short-range wireless device 50, and/or power source 52).

Figure 3:
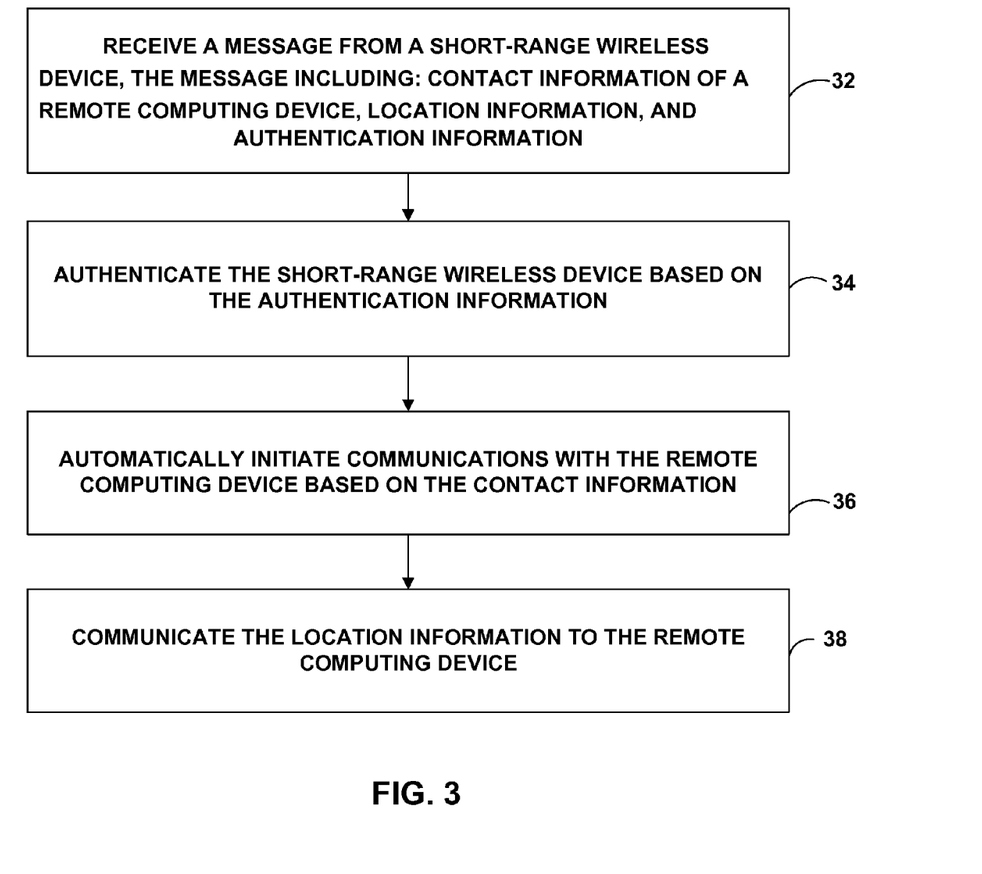
FIG. 3 is a flowchart illustrating an example method of a computing device interacting with an NFC tag according to some examples of the present disclosure.

FIG. 3 is a flow chart illustrating an example process for initiating communications from a computing device. The process may include receiving, by a computing device via short-range wireless communication, a message from a short-range wireless device, the message including contact information of a remote computing device that is external both to the computing device and to the short-range wireless device, location information associated with the short-range wireless device, and authentication information usable by the computing device to authenticate the short-range wireless device (32). The process may further include, responsive to receiving the message from the short-range wireless device, authenticating the short-range wireless device based on the authentication information (34). The message may further include, responsive to the authenticating, automatically initiating communications by the computing device with the remote computing device based on the contact information (36). The message may further include communicating the location information associated with the short-range wireless device to the remote computing device (38).

In some examples, short-range communication may include near field communication. In some examples, the message from the short-range wireless device may further include one or more pieces of metadata. In some examples, the one or more pieces of metadata may include authentication information. In some examples, the communicating may include automatically sending a text message to a phone associated with a phone number that is specified in the contact information in the message, and may also include automatically populating the text message with at least one of the location information and the one or more pieces of metadata. In some examples, the one or more pieces of metadata may include a discount code and the text message is populated with the one or more pieces of metadata.

In some examples, the communicating may include placing a voice call to a phone associated with a phone number that is specified in the contact information in the message. In some examples, the phone may also be associated with an extension number that is specified in the location information of the message. In some examples, the communicating may include automatically initiating a video communications session with a user associated with a nickname that is specified in the contact information in the message. In some examples, the communicating may include automatically initiating an instant messaging session with a user specified in the contact information.

In some examples, the communicating may also include receiving information from a directory server having an address specified in the contact information, the information including directional information between an origin location specified in the location information and a destination location specified in the one or more pieces of metadata, and may further include outputting the received directional information.

In some examples, the communicating may also include navigating, by the computing device, to a web page hosted on the remote device based on a universal resource locator (URL) specified in the contact information included in the message. In some examples, the method may further include sending the location information to the remote device, wherein content included in the web page is customized based on the location information.

Figure 4:
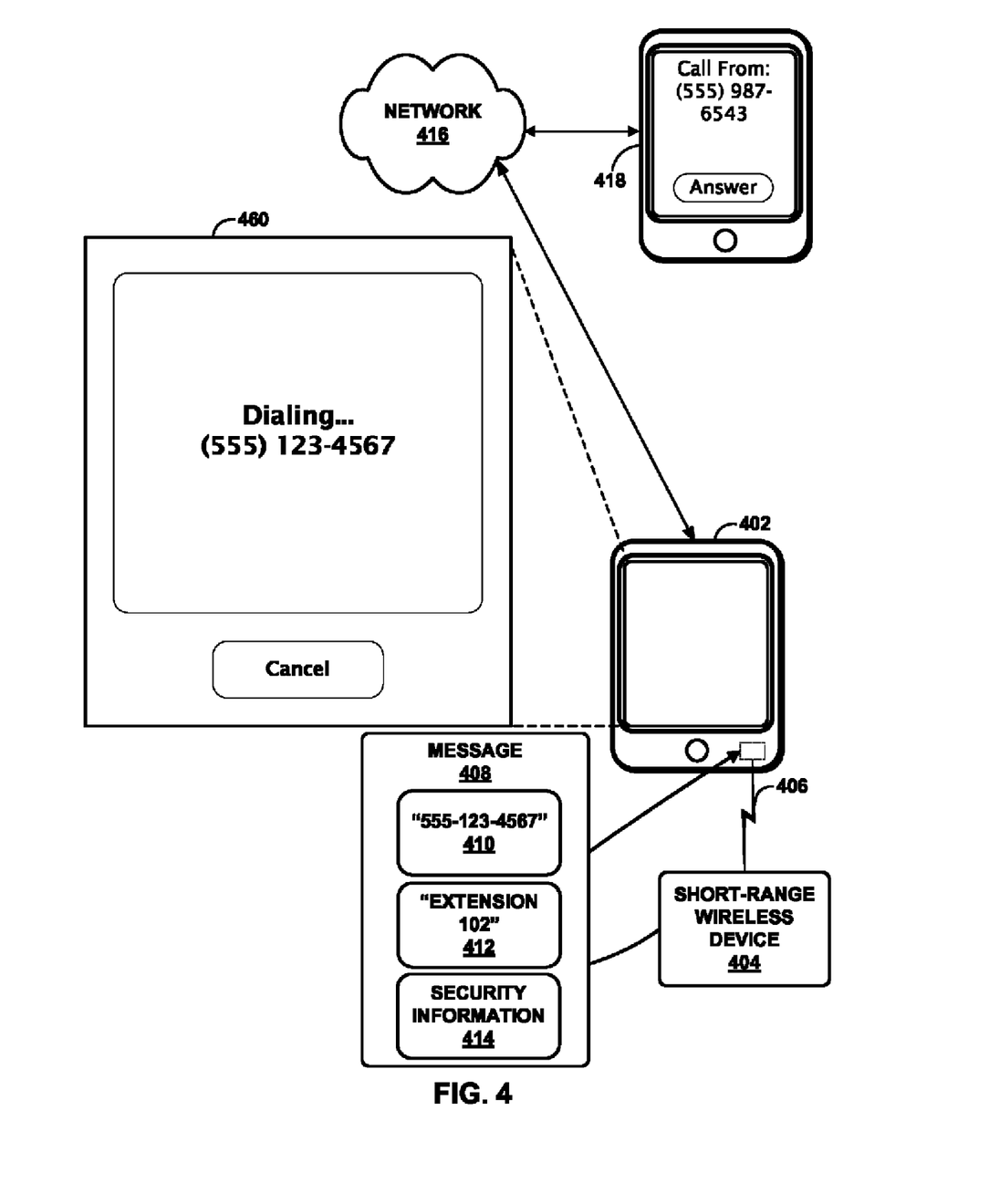
FIG. 4 is a conceptual diagram illustrating an example technique for initiating a phone call from a computing device according to some examples of the present disclosure.

FIG. 4 is a conceptual diagram illustrating an example technique for initiating a phone call from a computing device. As shown in FIG. 4, computing device 402, such as a mobile phone, may receive message 408 from short-range wireless device 404 via short-range wireless communication network 406. Computing device 402 may be similar to computing device 2 described in FIG. 1 and FIG. 2. Message 408 may include contact information 410, location information 412, and/or one or more pieces of metadata 414. In some examples, contact information 410 may specify a phone number, such as "555-123-4567". In some examples, location information 412 may specify a phone extension, such as "extension 102", that is associated with the location of short-range wireless device 404. In some examples, metadata 414 may specify security information, including but not limited to a pass phrase, a cryptographic key, a digital signature, or a signed certificate certifying the legitimacy of message 8.

In some examples, responsive to receiving message 408, computing device 402 may automatically launch a phone dialer application to initiate communications with a phone associated with the phone number specified by contact information 410. The computing device 402 may also automatically initiate dialing of the phone number (e.g., "555-123-4567") specified in contact information 410 in message 408, to place a voice call to remote device 418 associated with the phone number. Remote device 418, in this example, may be a mobile phone or a landline phone associated with the phone number (e.g., "555-123-4567") specified as contact information 410 in message 408. In some examples, if location information 412 specifies an extension, such as "extension 102", that extension may be automatically dialed by computing device 402 once the call has been connected to initiate communications with a phone associated with the extension that was specified in location information 412. In some examples, computing device 402 may output status of the voice call on user interface 460.

In some examples, responsive to receiving message 408 from short-range wireless device 4, computing device 402 may automatically launch a phone dialer application and may automatically input the phone number specified in contact information 410 into the phone dialer application as the phone number of the phone to be dialed, but may wait for the user to perform an action, such as selecting a "call" button, to dial the phone number and to thereby initiate communications with remote device 418 associated with the phone number. In some examples, responsive to receiving message 408 from short-range wireless device 404, computing device 402 may save the phone number included as contact information 410 in message 408 into an a contacts list or address book of computing device 402.

In some examples, responsive to receiving message 408, computing device 402 may automatically authenticate short-range wireless device 404 based on the security information specified by metadata 414 to determine that message 408 may be authorized to cause computing device 402 to initiate communications with remote computing device 418. In some examples, if metadata 414 specifies a passphrase, computing device 402 may compare the passphrase specified by metadata 414 with a passphrase stored in computing device 402 to determine if there is a match. In some examples, if metadata 414 specifies a signed certificate, computing device 420 may communicate with a certificate authority to determine the legitimacy of the signed certificate. If computing device 402 determines that message 408 is authorized, computing device 402 may, responsive to the determination and without user intervention, initiate communications with remote computing device 418 based on contact information 410.

Figure 5:
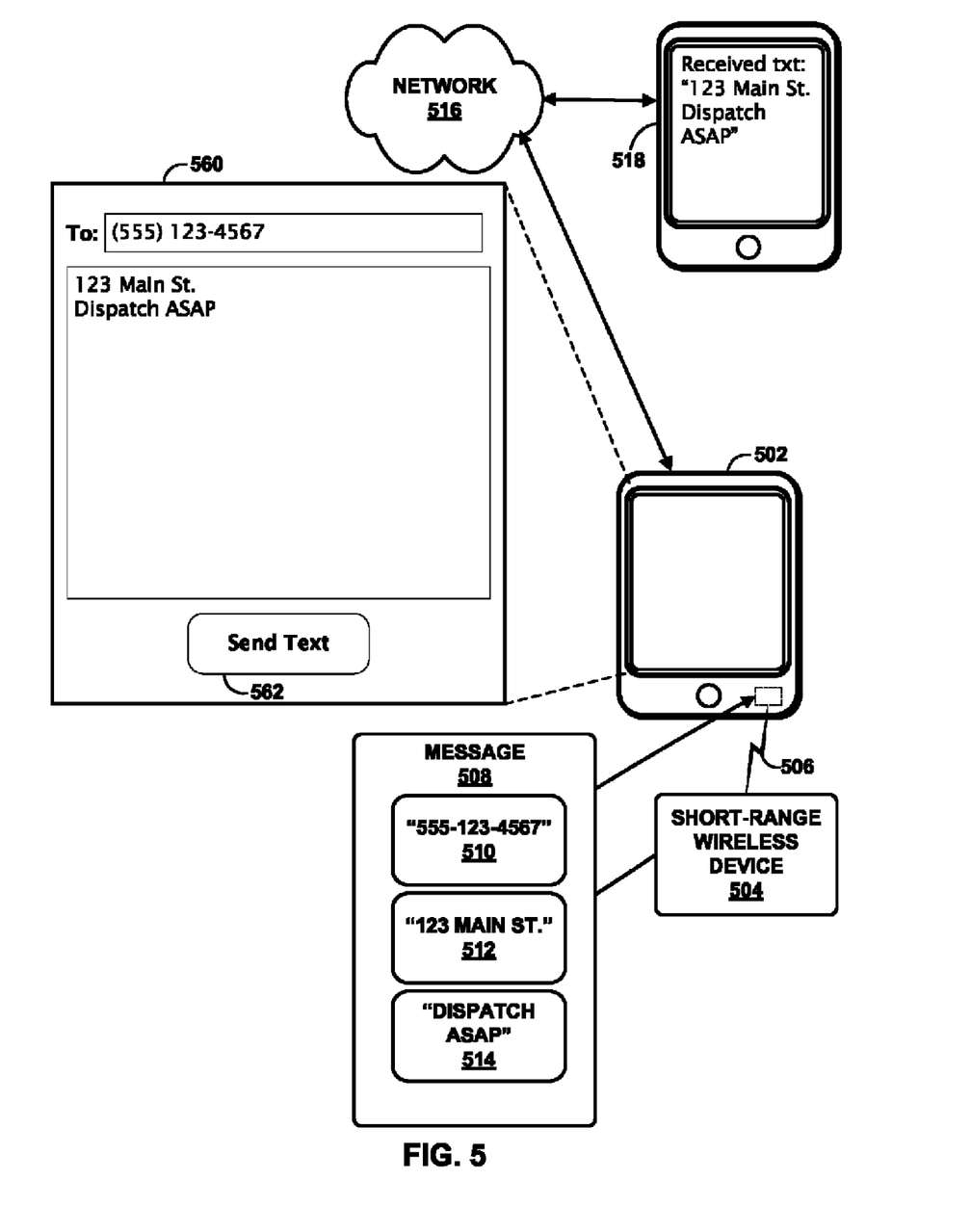
FIG. 5 is a conceptual diagram illustrating an example technique for sending a text messaging from a computing device according to some examples of the present disclosure.

FIG. 5 is a conceptual diagram illustrating an example technique for sending a text messaging from a computing device. As shown in FIG. 5, computing device 502 may receive message 508 from short-range wireless device 504 via short-range wireless communication network 506. Computing device 502 may be similar to computing device 2 of FIG. 1 and FIG. 2. Message 508 may include contact information 510, location information 512, and metadata 514.

In some examples, contact information 510 may specify a phone number, such as "555-123-4367", that is associated with a phone at a taxi dispatcher or a hotel reservations desk. In some other examples, contact information 510 may specify an e-mail address, a nickname, or a handle. In some examples, location information 512 may specify a pickup address, such as "123 Main St." In some examples, location information 512 may specify a city, an airport code, a street address, the name of a building, the name of a landmark, name of cross streets, or GPS coordinates.

Responsive to receiving message 508, computing device 502 may automatically launch a text messaging application, create an outgoing text message, populate the body of the outgoing text message, and initiate sending of the outgoing text message via network 516 to remote device 518 associated with the phone number specified by contact information 510. In some examples, remote device 518 may be a mobile phone or a landline phone associated with the phone number (e.g., 555-123-4567) specified in contact information 510. In some examples, responsive to receiving message 508, computing device 502 may, without user intervention, launch the text messaging application, create an outgoing text message, populate the body of the outgoing text message with content, such as the pickup address (e.g., "123 Main St.") in the context of a taxi dispatch, specified in location information 512, and send the outgoing text message to the phone associated with the phone number specified in contact information 510.

In some examples, responsive to receiving message 508, computing device 502 may automatically launch the text messaging application, create an outgoing text message, populate the body of the outgoing text message with content, and input the phone number specified in contact information 510 into the text messaging application as the intended destination of the outgoing text message, but may wait for the user to perform an action, such as selecting "send" button 562, before sending the outgoing text message to remote server 518, which may be the phone associated with the phone number specified in contact information 510. In some example, computing device 502 may display the text messaging application on user interface 560.

In some examples, message 508 may also include location information 512 and/or metadata 514 in addition to contact information 510. Location information 512 may, in some examples, be associated with short-range wireless device 504, so that location information 512 may contain or otherwise provide information regarding the location of short-range wireless device 504, including but not limited to the latitude and longitude of short-range wireless device 504, the street address of short-range wireless device 504, the city and/or state that short-range wireless device 504 is located in, the name of the building where short-range wireless device 504 is situated, the area of a building where short-range wireless device 504 resides, or an airport terminal location, so that a rental car shuttle or hotel shuttle may be notified of the airport terminal location where a pickup is requested.

In some examples, responsive to receiving message 508, computing device 502 may automatically populate a text message to include information based on location 512 and/or metadata 514. For example, in the context of sending a text message to a taxi dispatcher to call for a taxi, the text message may be populated with location 512 to indicate the location where the taxi should be dispatched for pickup. The text message may also be populated with data from metadata 514. In some examples, metadata 514 may be a phrase, such as "dispatch ASAP", thus indicating that the taxi should be dispatched as soon as possible. In some examples, metadata 514 may include a discount code that may be sent as part of the text message to the taxi dispatcher. In some examples, metadata 514 may include the drop-off location for a taxi.

In some examples, contact information 510 of message 508 may specify an e-mail address, and computing device 502 may, after receiving message 508, automatically launch an e-mail application and send an e-mail to the e-mail address specified in contact information 510. Remote device 518 may, in some examples, may be an e-mail server for the e-mail address specified in contact information 510 of message 508. Remote device 518 may, in some other examples, be a remote computing device that is logged into the e-mail account for the e-mail address specified in contact information 510 of message 508.

In some examples, contact information 510 of message 508 may specify an instant message nickname associated with a remote user. In some examples, an instant message nickname may be an alias of the remote user and may be used to identify the remote user in an instant messaging service. Computing device 502 may, after receiving message 508, launch an instant messaging application to send a message or to otherwise initiate a messaging session with the user associated with the instant message nickname specified in contact information 510. In some examples, remote device 518 may be a server where the user associated with the instant message nickname specified in contact information 510 of message 508 is logged in or otherwise active. In some examples, remote device 518 may be a personal computer that the remote user associated with the instant message nickname specified in contact information 510 is using to conduct the instant message session.

Figure 6:
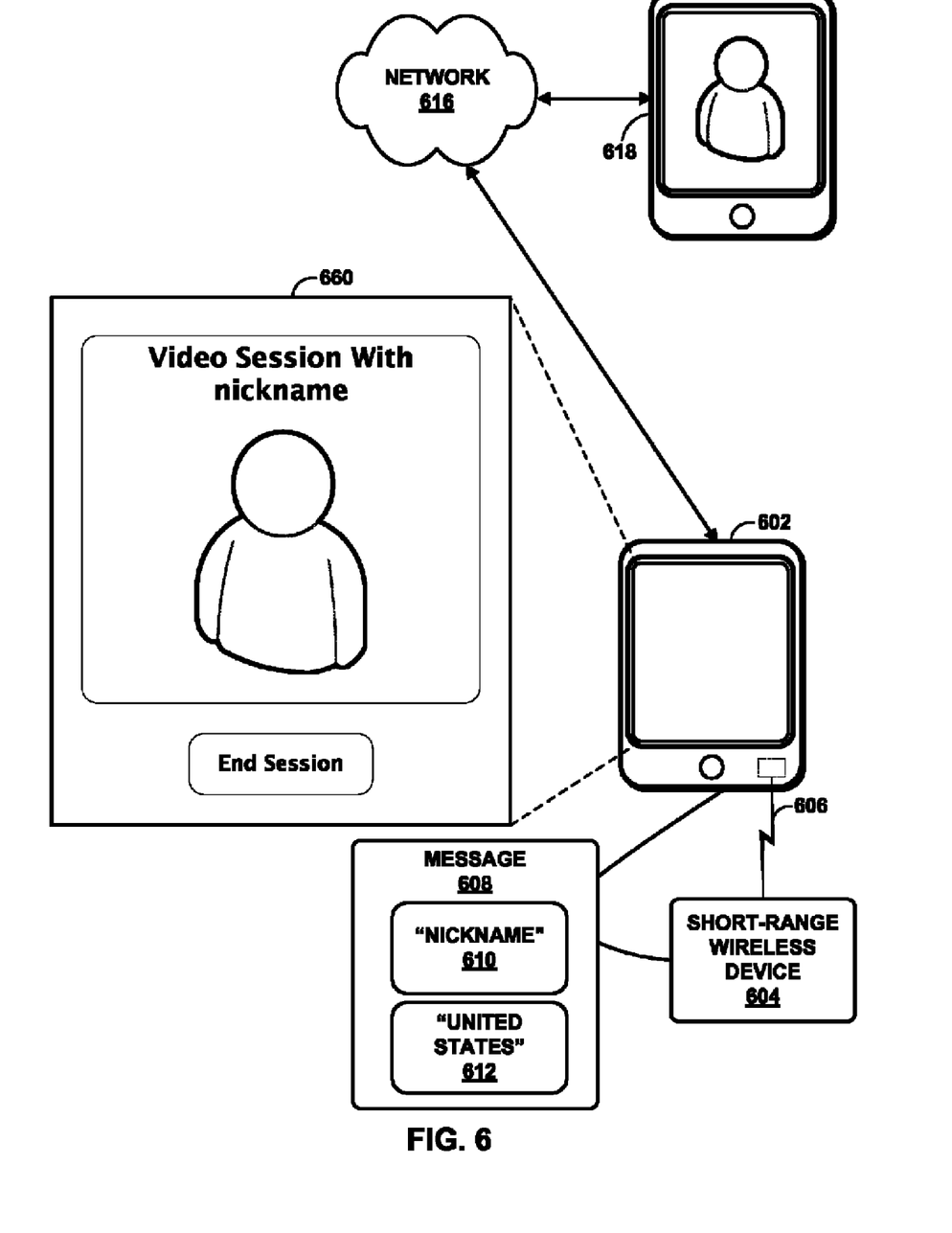
FIG. 6 is a conceptual diagram illustrating an example technique for initiating a video conferencing session from a computing device according to some examples of the present disclosure.

FIG. 6 is a conceptual diagram illustrating an example technique for initiating a video conferencing session from a computing device. As shown in FIG. 6, computing device 602, such as a mobile phone, may receive message 608 from short-range wireless device 604 via short-range wireless communication network 606. Computing device 602 may be similar to the computing device 602 of FIG. 1 and FIG. 2. Message 608 may include contact information 610 and location information 612. Contact information 610, in some examples, may specify a nickname, such as "nickname", associated with a user of a video conferencing service or application. In some examples, the nickname may be an alias identifying its associated user with the video conferencing service or application. In some examples, contact information 610 may specify a phone number, an e-mail address, an internet protocol address, a handle, or any other suitable identifier. Location information 612, in some examples, may specify an identifier of the location of the user of the computing device 602, such as "United States".

Responsive to receiving message 608, computing device 602 may automatically launch a video conferencing application and may automatically initiate communications with a remote user associated with the nickname specified in contact information 610 to start a video conferencing session over network 618 via remote device 618. Remote device 618, in this example, may be a mobile phone that is being used by the remote user associated with nickname specified in contact information 610. In some examples, computing device 602 may also send location information 612, such as "United States", to remote device 618. The video conferencing session may be shown on, for example, user interface 660 of computing device 602.

The sending of location information 612 to remote device 618 may be useful in certain contexts. For example, in the context of a video conferencing with a customer service representative, remote device 618 may use location information 612 sent by computing device 602 to route the user to the appropriate representative for his location, such as an English speaking representative for customers calling from an English-speaking country.

In some examples, responsive to receiving message 608 from short-range wireless device 604, computing device 602 may automatically launch a video communications application and initiate a video communications session with a remote user associated with the nickname specified in contact information 610. In some examples, computing device 602 may automatically launch the video communications application and may automatically input the nickname specified in contact information 610 into the video communications application as the nickname to initiate a video communications session with, but may wait for the user to perform an action, such as selecting a "call" button, to place the call to the remote user associated with the nickname and initiate the video communications session.

In some examples, if contact information 610 specifies a phone number, then contact information 610 may, in effect, specify the remote device 618, such as a mobile phone, having associated with that phone number. In some examples, if contact information 610 specifies an e-mail address or a nickname, then contact information 610 may, in effect, specify the remote device 618 that a user associated with that e-mail address or nickname is logged into. In some examples, if contact information 610 specifies an IP address, then contact information 610 may, in effect, specify the remote device 618 associated with the IP address.

Figure 7:
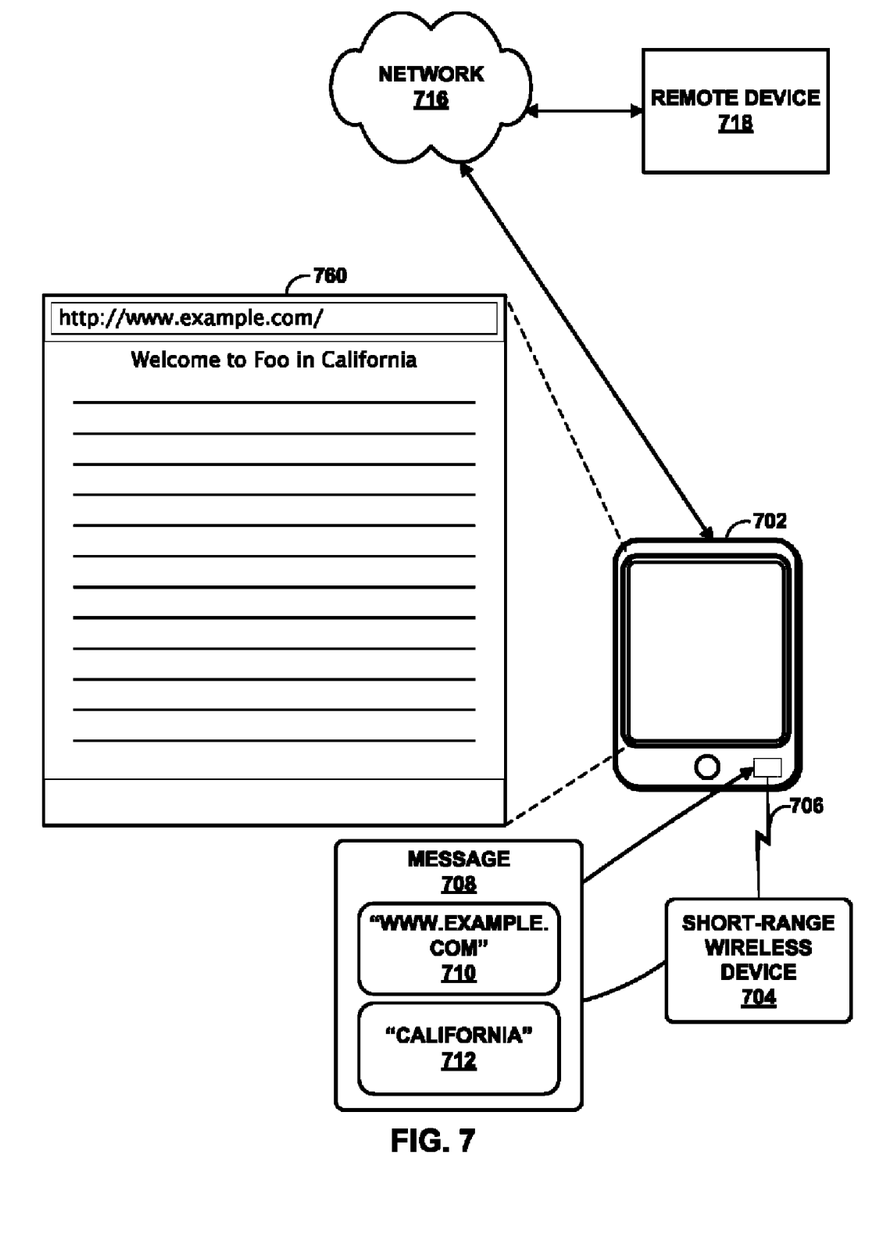
FIG. 7 is a conceptual diagram illustrating an example technique for initiating browsing of a web site from a computing device according to some examples of the present disclosure.

FIG. 7 is a conceptual diagram illustrating an example technique for initiating browsing of a web site from a computing device. As shown in FIG. 7, computing device 702, such as a mobile phone, may receive message 708 from short-range wireless device 704 via short-range wireless communication network 706. Computing device 702 may be similar to computing device 2 of FIG. 1 and FIG. 2. Message 708 may include contact information 710 and location information 712. Contact information 710, in this example, may specify a universal resource locator (URL), such as "www.example.com", that indicates a web page and/or web server. In some examples, contact information 10 may specify an IP address or any other information indicating a web site. Location information 712, in some examples, may specify a location, such as a U.S. state (e.g., "California"), that is associated with NFC tag 704.

Responsive to receiving message 708, computing device 702 may automatically launch a web browsing application and may automatically navigate to a web page hosted on remote device 718 based on the URL (e.g., "www.example.com") specified in contact information 710, so that computing device 702 may display the web page at user interface 760. Remote device 718 may, for example, be a web server that hosts and serves the web page indicated by the contact information 710 in message 708.

In some examples, content included in the web page may be customized based on content specified in the location information 712. For example, location information 712, such as "California", may be used to customize the web page to display custom weather or traffic information based on location information 712.

Figure 8:
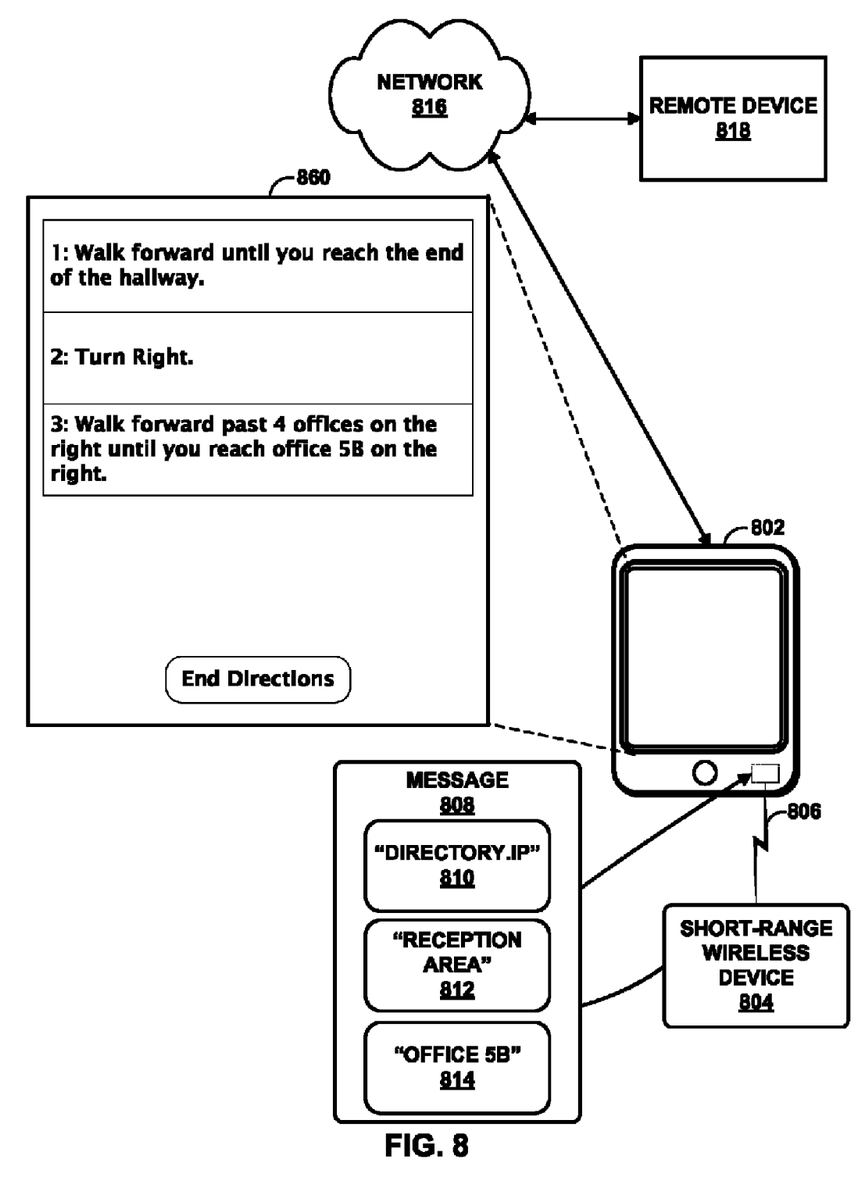
FIG. 8 is a conceptual diagram illustrating an example technique for initiating navigation from a computing device according to some examples of the present disclosure.

FIG. 8 is a conceptual diagram illustrating an example technique for initiating navigation from a computing device. As shown in FIG. 8, computing device 802, such as a mobile phone, may receive message 808 from short-range wireless device 804 via short-range wireless communication network 806. Computing device 802 may be similar to computing device 2 of FIG. 1 and FIG. 2. Message 808 may include contact information 810, location information 812, and metadata 814. Contact information 810 may, in some examples, specify a URL (e.g., "directory.ip") associated with a directory server, such as remote device 818. Location information 812, in some examples, may specify the location associated with NFC tag 804, such as the location where NFC tag 804 is located. In one example, location information 812 may indicate the area, such as "reception area", in an office building where NFC tag 804 is located.

Metadata 814, in some examples, may specify a destination location, such as "Office 5B", for which directions should be retrieved. In some examples, metadata 814 may be a destination address, including but not limited to an office number or the name of a person occupying a specific office.

Responsive to receiving message 808, computing device 802 may automatically contact a directory server, such as remote device 818 based on contact information 810 to send location information 812 specifying the current location of short-range wireless device 804, as well as metadata 814 specifying a destination location. Responsive to sending the data to remote device 818, computing device 802 may receive information from remote device 818, including but not limited to directional information between an origin location, such as the current location of NFC tag 804 that was specified in location information 812, and a destination location, such as the office number specified in metadata 814. The directional information may allow a user of computing device 802 to navigate from the origin location to the destination location. In some examples, the directional information received by computing device 802 may include but is not limited to GPS coordinates, text directions, audio directions, and visual directions. In some examples, computing device 802 may output the directional information received from remote device 818 at user interface 860.

In some examples, short-range wireless device 804 may be situated at a reception area of an office complex. The reception area may contain a directory that lists employees having an office located within the office complex. The directory may also have a short-range wireless device placed next to each employee listed in the directory. A user looking for directions to the office of a specific employee within the office complex may place computing device 802, such as a mobile phone, near the short-range wireless device 804 next to the name of the specified employee listed within the directory. Computing device 802 may receive message 808 from short-range wireless device 804. Message 808 may contain contact information 810, location information 812, and metadata 814. In some examples, metadata 814 may specify the name of the employee, the office name/number of the employee, and/or any other information identifying the office of the employee. Responsive to receiving message 808 from short-range wireless device 804, computing device 802 may automatically communicate with remote device 818, such as a directory server, to receive directional information from remote device 818. Directional information may include information for navigating from the user's location to the desired office. In some examples, the directional information may include but is not limited to a list of directions, a map, or multimedia data, such as audiovisual data.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in a computer-readable medium, such as a computer-readable storage medium, containing instructions. Instructions embedded or encoded in a computer-readable medium, including a computer-readable storage medium, may cause one or more programmable processors, or other processors, to implement one or more of the techniques described herein, such as when instructions included or encoded in the computer-readable medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may comprise one or more computer-readable storage media. In some examples, an article of manufacture may comprise one or more computer-readable storage media.

In some examples, computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

Various examples of the disclosure have been described. These and other embodiments are within the scope of the following claims.

The invention claimed is:

1. A method comprising:
  receiving, by a computing device via short-range wireless communication, a message from a short-range wireless device, the message including:
    contact information of a remote computing device that is external both to the computing device and to the short-range wireless device,
    location information associated with the short-range wireless device, and
    authentication information usable by the computing device to authenticate the short-range wireless device;
  responsive to receiving the message from the short-range wireless device, determining if the short-range wireless device is authorized to cause the computing device to automatically initiate communications with the remote computing device by authenticating the short-range wireless device based on the authentication information;
  if the short-range wireless device is successfully authenticated based on the authentication information, automatically initiating communications, by the computing device with the remote computing device based on the contact information; and
  after initiating communications with the remote computing device, communicating the location information associated with the short-range wireless device to the remote computing device.

2. The method of claim 1, wherein the message from the short-range wireless device includes one or more pieces of metadata.

3. The method of claim 2, wherein the one or more pieces of metadata includes the authentication information.

4. The method of claim 2, wherein the communicating comprises:
  automatically sending a text message to a phone associated with a phone number that is specified in the contact information in the message.

5. The method of claim 4, further comprising:
  automatically populating the text message with at least one of the location information and the one or more pieces of metadata.

6. The method of claim 5, wherein:
  the one or more pieces of metadata includes a discount code; and
  the text message is populated with the one or more pieces of metadata.

7. The method of claim 2, wherein the communicating comprises:
  receiving information from a directory server having an address specified in the contact information, the information including directional information between an origin location specified in the location information and a destination location specified in the one or more pieces metadata; and
  outputting the received directional information.

8. The method of claim 1, wherein short-range wireless communication includes near field communication (NFC).

9. The method of claim 1, further comprising:
  automatically initiating a voice call to a phone associated with a phone number that is specified in the contact information of the message.

10. The method of claim 9, wherein the phone is also associated with an extension number that is specified in the location information of the message.

11. The method of claim 1, wherein the communicating comprises:
  automatically initiating a video communications session with a remote user associated with a nickname specified in the contact information of the message.

12. The method of claim 1, wherein the communicating comprises:
  navigating, by the computing device, to a web page hosted on the remote device based on a universal resource location (URL) specified in the contact information of the message.

13. The method of claim 12, further comprising:
  sending the location information to the remote device, wherein content included in the web page is customized based on the location information.

14. The method of claim 1, wherein the communicating comprises:
  initiating an instant messaging session with a user specified in the contact information.

15. A computing device comprising:
  one or more processors;
  a first short-range wireless device configured to receive a message from a second short-range wireless device via short-range wireless communication, the message including contact information of a remote computing device that is external both to the computing device and to the second short-range wireless device, location information associated with the second short-range wireless device, and authentication information usable by the computing device to authenticate the second short-range wireless device, and further configured to automatically input, responsive to receiving the message, the contact information of the remote computing device into a communication application; and
  the communication application operable by the one or more processors to determine if the second short-range wireless device is authorized to cause the computing device to automatically initiate communications with the remote computing device by authenticating the second short-range wireless device based on the authentication information, and further operable by the one or more processors to, if the second short-range wireless device is successfully authenticated based on the authentication information, initiate communications with the remote computing device based on the contact information inputted by the first short-range wireless device.

16. The computing device of claim 15, wherein:
the communication application comprises a phone dialer application that is configured to initiate a voice call to a phone associated with a phone number specified in the contact information in the message.

17. The computing device of claim 15, wherein:
the communication application comprises a video conferencing application that is configured to initiate a video communications session with a user associated with a nickname specified by the contact information in the message.

18. The computing device of claim 15, wherein:
the communication application comprise a text messaging application that is configured to send a text message to a phone associated with a phone number specified in the contact information in the message.

19. The computing device of claim 18, wherein:
the text messaging application is configured to populate the text message with at least one of the location information and one or more pieces of metadata included in the message.

20. A computer-readable storage medium comprising instructions that, when executed on at least one programmable processor, cause the at least one programmable processor to perform operations comprising:
receiving, by a computing device via short-range wireless communication, a message from a short-range wireless device, the message including contact information of a remote computing device that is external both to the computing device and to the short-range wireless device, and one or more pieces of metadata;
responsive to receiving the message from the short-range wireless device, determining if the short-range wireless device is authorized to cause the computing device to automatically create an outgoing message directed to the remote computing device by authenticating the short-range wireless device;
if the short-range wires device is successfully authenticated, automatically creating, by the computing device, an outgoing message directed to the remote computing device based on the contact information; and
populating, by the computing device without user intervention, a body of the outgoing message based on the one or more pieces of metadata.

* * * * *